United States Patent [19]
Talamini, Sr.

[11] Patent Number: 6,076,755
[45] Date of Patent: Jun. 20, 2000

[54] DEVICE FOR MOVING A SPOOLED STACK OF OPTICAL FIBERS

[76] Inventor: Victor J. Talamini, Sr., 626 Fox Farm Rd., Asbury, N.J. 08802

[21] Appl. No.: 09/317,977

[22] Filed: May 25, 1999

[51] Int. Cl.[7] .............................. B65H 49/00; B65H 75/44
[52] U.S. Cl. ............................................ 242/129; 242/398
[58] Field of Search ................... 242/398, 129, 242/166, 171, 591, 222, 399

[56] References Cited

U.S. PATENT DOCUMENTS

| | | | |
|---|---|---|---|
| 1,600,462 | 9/1926 | Nuhring | 242/399 X |
| 2,601,960 | 7/1952 | Hick | 242/129.6 |
| 3,014,336 | 12/1961 | Henry | 242/166 |
| 3,371,885 | 3/1968 | Douglas | 242/129 |
| 3,491,967 | 1/1970 | Sawyer et al. | 242/129 |
| 4,330,005 | 5/1982 | Kjarsgaard | 242/129 X |
| 4,340,183 | 7/1982 | Zitzman | 242/129 X |
| 4,384,688 | 5/1983 | Smith . | |
| 4,664,260 | 5/1987 | Stokes | 242/129 X |
| 4,715,549 | 12/1987 | Travlos | 242/129 X |
| 4,741,492 | 5/1988 | Reysen | 242/129 |
| 4,765,560 | 8/1988 | Branback | 242/129 |
| 4,768,732 | 9/1988 | Greenleaf | 242/129 X |
| 4,786,213 | 11/1988 | Leppanen | 242/129 X |
| 4,796,939 | 1/1989 | Symonds et al. | 242/129 X |
| 4,826,100 | 5/1989 | Belliveau | 242/129 |
| 4,844,376 | 7/1989 | Maraman, Sr. | 242/129 |
| 4,856,729 | 8/1989 | Maraman | 242/129 |
| 4,886,336 | 12/1989 | Duesser et al. . | |
| 4,913,365 | 4/1990 | Shamass | 242/591 |
| 5,078,332 | 1/1992 | Carter | 242/129 |
| 5,193,758 | 3/1993 | Laager et al. | 242/129 X |
| 5,320,301 | 6/1994 | Cross | 242/129 |
| 5,348,241 | 9/1994 | Huette | 242/129 X |
| 5,651,510 | 7/1997 | Eble et al. | 242/129 X |
| 5,996,930 | 12/1999 | Katayama et al. . | |

Primary Examiner—Donald P. Walsh
Assistant Examiner—Collin A. Webb

[57] ABSTRACT

A device is provided for moving a plurality of fibers parallel to a spooling axis around which the fibers are spooled. The device can include a plurality of lifters adapted to be disposed beneath at least a bottom-most fiber from the plurality of fibers and adapted to be movable parallel to the spooling axis.

22 Claims, 7 Drawing Sheets

DEVICE FOR MOVING A SPOOLED STACK OF OPTICAL FIBERS

CROSS-REFERENCES TO RELATED APPLICATIONS

This invention relates to the following co-pending applications, which are incorporated by reference:

"Device for Separating Portions of Spooled Optical Fibers", Ser. No. 09/317,827, filed May 25, 1999;

"Device for Segregating Optical Fibers", Ser. No. 09/317,826, filed May 25, 1999; and "Device for Storing Optical Fibers", Ser. No. 09/317,643, filed May 25, 1999.

FIELD OF THE INVENTION

The present invention relates to the field of optical fiber storage systems and, more particularly, to a device for moving a spooled stack of optical fibers.

BACKGROUND OF THE INVENTION

In a submarine optical transmission system, optical signals transmitted through the submarine optical fiber cable become attenuated over the length of the cable, which may stretch thousands of miles. To compensate for this signal attenuation, optical repeaters are strategically positioned along the length of the cable.

FIG. 1 illustrates a perspective view of a typical submarine optical repeater 10 having a cylindrical housing 12. A first submarine optical cable 16 enters repeater 10 at first end cover 14 and connects to first internal optical cable 18, which, in turn, connects to an optical repeater assembly 20. Optical repeater assembly 20 typically includes at least the following items (not shown in FIG. 1): optical components, connecting optical fibers, electronic circuits, and connecting wiring. Optical repeater assembly 20 connects via a second internal optical cable 19 to a second submarine optical cable 17, which exits repeater 10 at second end cover 15.

Typically, the optical fibers found within optical repeaters are circular in cross-section, and are constructed of glass surrounded by a protective jacket that is thicker than the glass. For example, a typical glass fiber ("glass fiber", "bare fiber", or "unjacketed fiber") can have an outer diameter of approximately 0.010 inches, and a typical jacketed fiber can have an outer diameter of approximately 0.040 to 0.060 inches.

The glass fiber is fragile. Because even microscopic damage to the glass fiber can adversely affect the reliability of the optical repeater (and, as a result, the reliability of the entire submarine optical fiber cable system), great efforts are normally taken to protect the glass fiber from damage. Generally, the likelihood of damage to the glass fiber can be reduced by ensuring that any curvature in the glass fiber meets or is less than the minimum bending radius of the glass fiber. However, the minimum bending radius of the glass fiber is a function of the expected life of the glass fiber. For example, when at least a 25-year life is expected, the glass fiber typically has a minimum bending radius of approximately 1 inch. This is referred to as the reliability-adjusted minimum bending radius of the glass fiber, because meeting or exceeding this value provides acceptable reliability from bending damage during the expected life of the glass fiber.

Typically, the optical components found within optical repeaters are manufacturer with a segment of optical fiber attached at each end and cut to a specified length. Each fiber segment contains a jacketed portion of specified length located adjacent to the optical component, and a bare portion of specified length extending from the opposite end of the jacketed portion. The bare portion is spliced into the bare portion of another segment in the repeater's optical circuit. Creating these splices can be a complicated task, requiring substantial lengths of bare fiber on each side of the splice. Optimally however, the repeater is designed to be as space-efficient as possible, thereby minimizing its production, storage, shipping, and installation costs. Thus, it is desirable to store each optical fiber segment in the most space-efficient manner possible.

FIG. 2 illustrates a perspective view of a known fiber storage device that can be located within, for example, a submarine optical repeater or branching unit. Tray 42 includes generally circular portal spool 44 which is surrounded by generally square portal well 48. The square portal well includes a fiber portal 68. Tray 42 also includes generally circular storage spool 46 which is surrounded by generally square storage well 50. Optical device 54 is mounted to tray 42 in optical cavity 52 which is connected to storage well 50 by cavity-to-storage channel 58 and by storage-to-cavity channel 64. Optical cavity 52 is connected to portal well 58 by portal-to-cavity channel 72 and cavity-to-portal channel 66.

Optical device 54 is connected to jacketed storage fiber 56 at the end of optical device 54 nearest storage well 50. Just inside storage well 50, jacketed storage fiber 56 connects to bare storage fiber 59. The end of bare storage fiber 59 is spliced to the end of bare connecting fiber 60 at splice 74. Bare connecting fiber 60 extends from splice 74 to jacketed connecting fiber 62 which, in turn, extends through storage-to-cavity channel 64, through optical cavity 52, through device-to-portal cavity 66, and into portal well 48. Within portal well 48, jacketed connecting fiber 62 wraps around portal spool 44 and exits at portal 68.

Jacketed connecting fiber 70 exits from the opposite end of optical device 54 and extends through portal-to-cavity channel 72, and into portal well 48, where it wraps around portal spool 44 and exits at portal 68. Spools 44 and 46 are designed with a radius greater than or equal to the reliability-adjusted minimum bending radius of the bare portion of fibers 56 and 60.

Although not shown, tray 42 can define more than one optical cavity and accompanying channels. In that situation, each additional optical fiber of any additionally mounted optical devices is routed and stored similarly to fibers 56, 59, 60, 62, and 70, i.e., in the channels connected to their respective optical cavity and around their respective spools. When more than one fiber is to be spooled around either spool 44 or 46, each additional fiber is wrapped around the spool generally above the preceding fibers, thereby forming a stack of spooled fibers.

Accessing a bare fiber stored in the known fiber storage devices can be challenging. For example, assume that four bare fibers are spooled in a stacked manner around the same spool, and that access to the bottom-most fiber in the stack is required. However, because the well is very compact, it is difficult for the assembler's fingers to reach therein, particularly when the well is more than a fraction of an inch in depth, as it typically is. Also, because the bare fibers are very small in diameter, each bare fiber can be very difficult to grab. Thus, a pointed stick is typically used to select a bare fiber and slide it to the top of well where it can be grasped. Then, the bare fiber is unspooled and moved out of the way, and the process repealed until the desired fiber is obtained. However, using a stick in this manner is a clumsy endeavor, and can cause scratches or other mechanical damage to the bare fibers. Thus, there is a need to provide an improved device for moving each spooled fiber within a fiber storage device.

SUMMARY OF THE INVENTION

Embodiments of the invention provide a device for moving a plurality of fibers parallel to a spooling axis around which the fibers are spooled. The device can include a plurality of lifters adapted to be disposed beneath at least a bottom-most fiber from the plurality of fibers and adapted to be movable parallel to the spooling axis.

BRIEF DESCRIPTION OF THE DRAWINGS

The invention will be more readily understood through the following detailed description, with reference to the accompanying drawings, in which.

DETAILED DESCRIPTION

A device is provided for moving a plurality of fibers parallel to a spooling axis around which the fibers are spooled. The device can include a plurality of lifters adapted to be disposed beneath at least a bottom-most fiber from the plurality of fibers and adapted to be movable parallel to the spooling axis.

As used herein, the term "fiber" can include any type of fiber in any system or component, provided that the fiber is spooled around a spooling axis. For example, the fiber can be an optical fiber such as that used in a submarine optical repeater or branching station.

As used herein, the term "lifter" can include any type of device that is adapted to be disposed beneath at least a bottom-most fiber from the plurality of fibers and is adapted to be movable parallel to the spooling axis.

Figure 1:
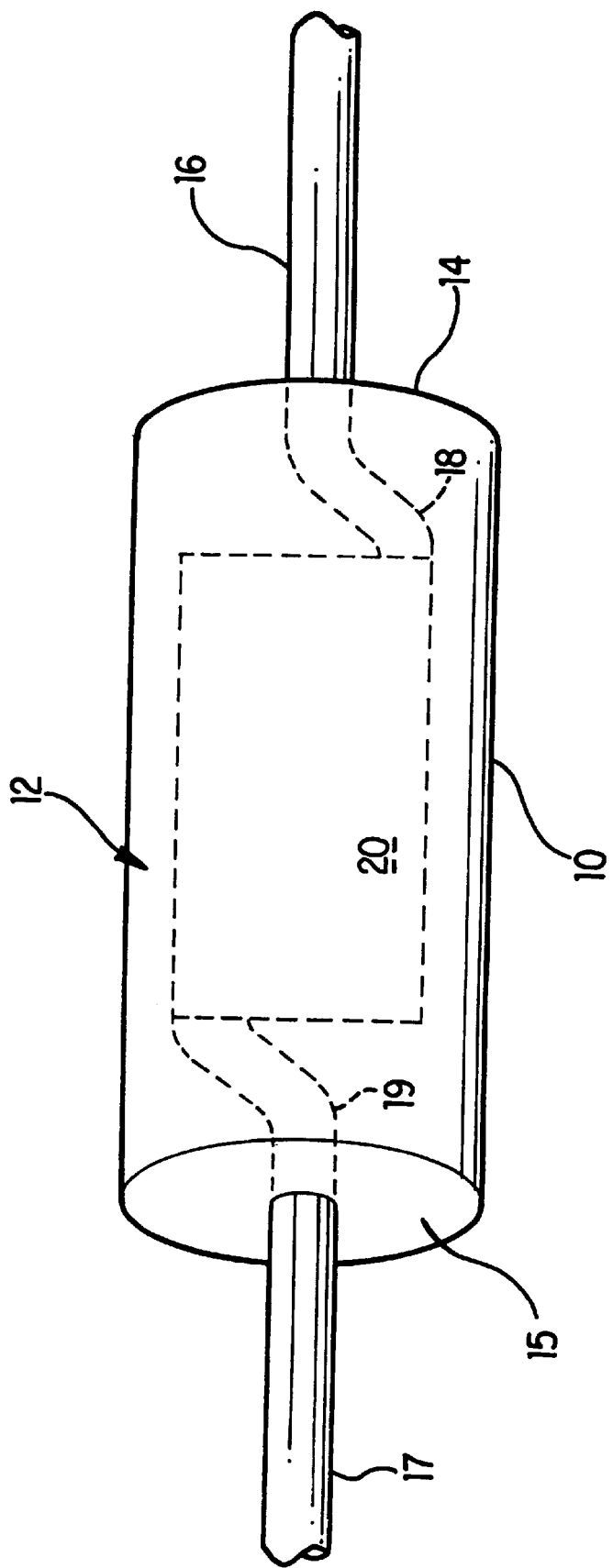
FIG. 1 is a perspective view of a known submarine optical repeater.
Figure 2:
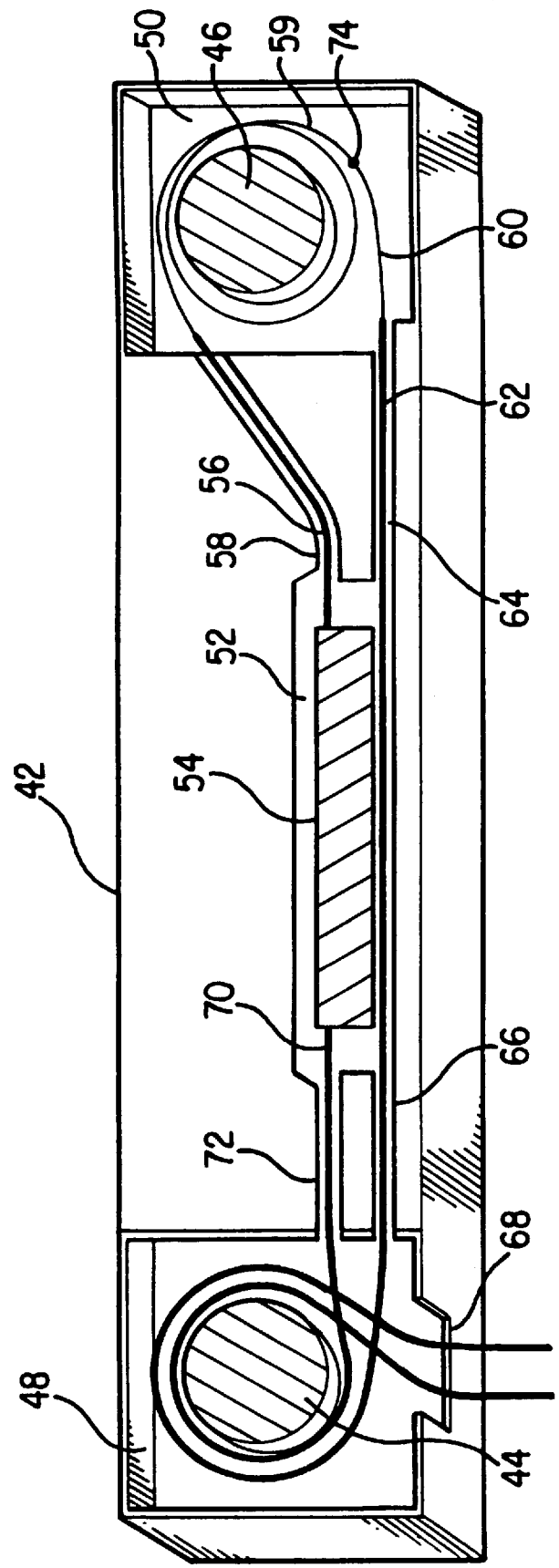
FIG. 2 is a perspective view of a known fiber storage device.
Figure 3:
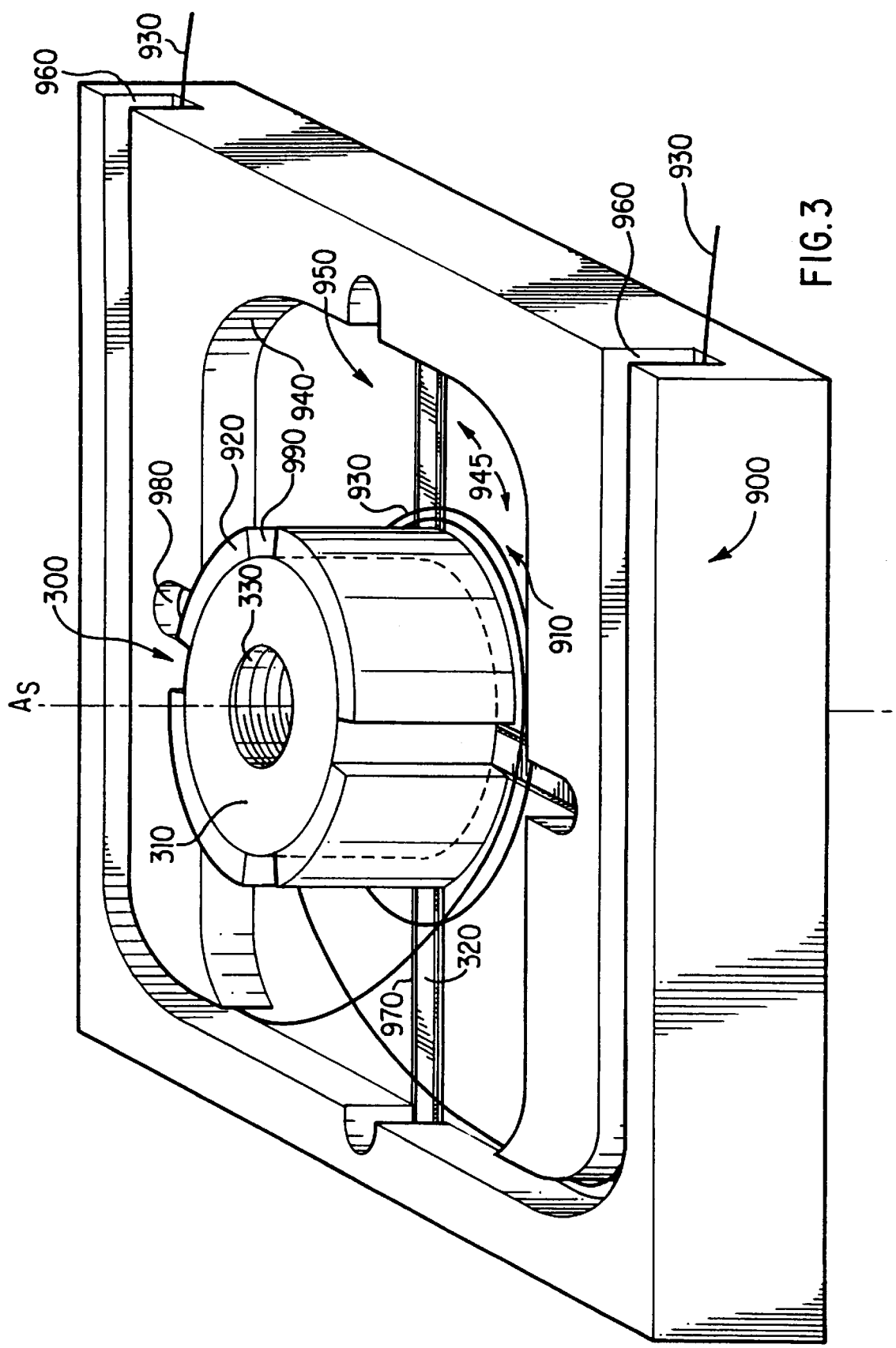
FIG. 3 is a perspective view of an embodiment of the invention.

FIG. 3 provides a perspective view of lifting device 300 which can work in conjunction with a fiber storage tray 900 having a well 910 that extends partially through the thickness of tray 900, thereby forming base 950, and well walls 940, and storage space 945. Well 910 can restrain spooled fibers from straightening. Well 910 can be any shape, and can be defined by a plurality of restrainment arms. However, well 910 is shown as an elongated generally circular shape, and thus base 950 can be generally circular, and well walls 940 can combine to form a generally continuous circumferential wall. Attached to base 950 and contained within well walls 940 can be at least one elongated generally annular spool 920 around which each fiber 930 can be spooled. Because spool 920 can be an elongated annular shape, it can have a longitudinal axis which can serve as a spooling axis ("$A_S$"). Also defined within tray 900 can be portal channels 960 for routing fibers 930 into and out of tray 900. Tray 900 can have additional channels (not shown) to route fibers to any optical devices (not shown) mounted on tray 900.

As can be seen in FIG. 3, lifting device 300 can comprise elongated generally annular wheel 310 and a plurality of lifters 320. Wheel 310 can rest against tray 900, and can be moved along its longitudinal axis away from tray 900. Spool 920 can substantially surround wheel 310, thereby radially constraining the motion of wheel 310.

Lifters 320 can be elongated, and can have a generally rectangular longitudinal cross-section, and can be generally equally distributed circumferentially around wheel 310. Lifters 320 can extend radially from wheel 310, through gaps 990 in spool 920, and through arm recesses 970 in base 950. Extending longitudinally along well wall 940 can be tip recesses 980 wherein lifters 320 can longitudinally terminate. However, in other embodiments, the lifters can have other shapes and can be distributed in any manner, so long as the shape and distribution of the lifters allow the lifters to be disposed beneath at least one spooled fiber and to be movable parallel to the spooling axis.

Referring to FIG. 3, in operation, wheel 310 can be moved vertically, along its longitudinal axis, to either a lower position, or to an upper position. In the lower position (shown), wheel 310 can allow spooled fibers 930 to be stored within well 910. When wheel 310 is in its lower position, wheel 310 can rest upon tray 900, and lifters 320 can be contained within arm recesses 970 so that no part of lifters 320 is above base 950. With lifters 320 contained below base 950, a first fiber 930 can be spooled on base 950, and additional fibers can be spooled above first fiber 930, one above the other.

To move a stack of fibers (not shown) out of well 910, wheel 310 can be moved along its longitudinal axis away from tray 900 toward the upper position (not shown). During this movement, lifters 320 can rise out of arm recesses 970 and can begin to press against the bottom-most spooled fiber 930, thereby lifting the entire stack of fibers to the upper position. In the upper position, fibers 930 can be completely removed from well 910. To assist in moving wheel 310, threaded rod (not shown), having an optional handle (not shown) can be screwed into the threaded inner circumference 330 of wheel 310 from above. Alternatively, threaded rod (not shown), having an optional handle (not shown) can extend through a hole (not shown) in the bottom of tray 900, and be screwed into the threaded inner circumference 330 of wheel 310 from below. Using the rod, wheel 310 can be moved away from tray 900 or moved toward tray 900.

Alternatively, the rod can be threaded through wheel 310 from above until it contacts tray 900, it which point continued threading of the rod can cause wheel 310 to lift within well 910. Because lifters 320 can extend into tip recesses 980, wheel 310 can be prevented from spinning when the rod is threaded within wheel 310.

Figure 4:
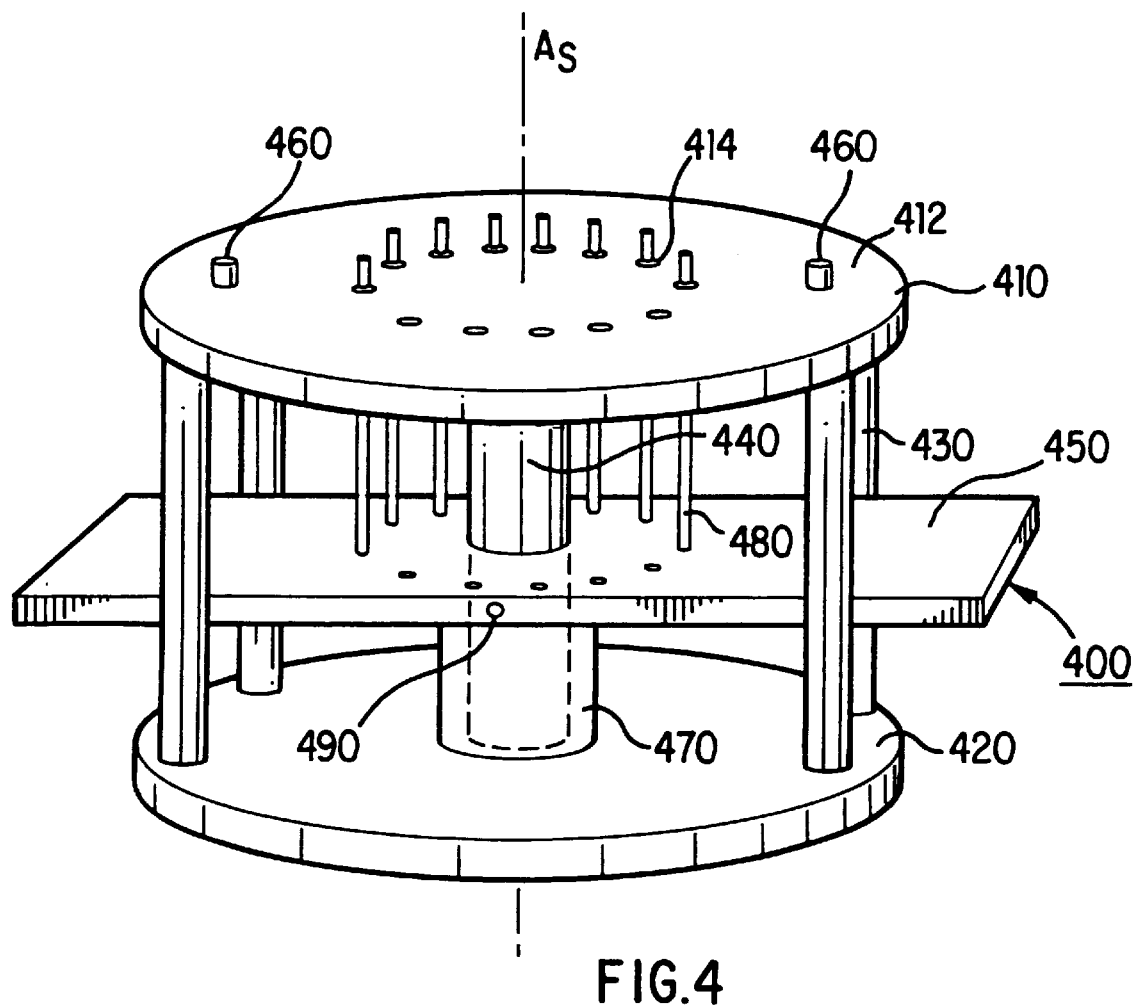
FIG. 4 is a perspective view of an alternative embodiment of the invention.

FIG. 4 provides a perspective view of an alternative embodiment of the present invention. Lifting device 400 can be removably in contact with base 800 (shown in FIG. 5). Generally flat circular top plate 410, which can be separated from a generally parallel, flat, circular, bottom plate 420 by perpendicular elongated center rod 440, can form a base supporting structure resembling a table. Four rod-like legs 430 can also be attached generally perpendicularly between top plate 410 and bottom plate 420 to stabilize top plate 410. Perpendicular to, and slidably surrounding center rod 440 can be a generally flat rectangular lifting plate 450. Attached to the top of lifting plate 450 in an annular pattern that can be co-axial with the longitudinal axis of center rod 440 can be a plurality (partially shown) of lifters 480. Corresponding to lifters 480 can be a plurality of plate holes 414 in top plate 410. At least two short locating pins 460 can extend from the top surface 412 of top plate 410.

In operation, lifting plate 450 can be moved along center rod 440 from the lower position (shown in FIG. 4) to an upper position (not shown) and eventually, back to the lower position. In the lower position, elongated generally circular stop 470 can surround center rod 440 below lifting plate 450, thereby preventing lifting plate 450 from traveling along center rod 440 below the lower position. In the upper position, the contact of lifting plate 450 against top plate 410 can prevent lifting plate 450 from rising higher. A threaded elongated circular locking screw 490 can extend radially from center rod 440 and through lifting plate 450, thereby providing a locking means that can prevent the travel of lifting plate 450 along center rod 440. Alternatively, to prevent the travel of lifting plate 450 along center rod 440, locking screw 490 can be replaced by a locking pin (not shown) that can extend into a corresponding hole (not shown) in center rod 440.

Figure 5:
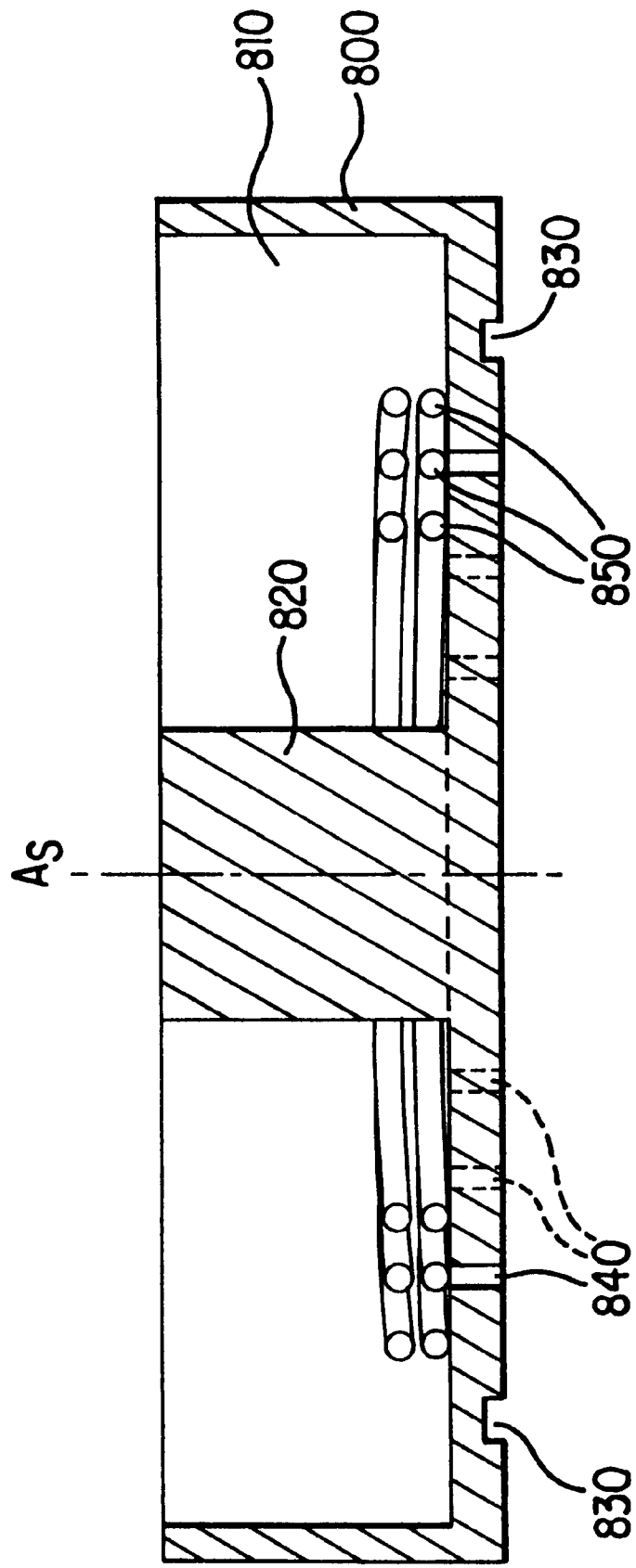
FIG. 5 is a cross-sectional view of a tray that can be used with the embodiment shown in FIG. 4.

FIG. 5 provides a cross-sectional view of base 800. Extending partially through the thickness of base 800 can be elongated generally circular well 810. Connected to base 800, and concentric with well 810 can be elongated generally circular spool 820. Because spool 820 can be an elongated circular shape, it can have a longitudinal axis which serves as a spooling axis As. The bottom of base 800 can define two short locating recesses 830 that can correspond to locating pins 460, thereby allowing base 800 to be releasably mounted in a consistent location upon top plate 410. When base 800 rests upon top plate 410, center rod 440 can be co-axial with the longitudinal axis of well 810 and spool 820. Also defined in the bottom of base 800 can be a plurality of base holes 840 that can correspond in a one-to-one manner with lifters 480 and plate holes 414. Base holes 840 can be located directly beneath the expected storage location of spooled fibers 850.

Figure 6:
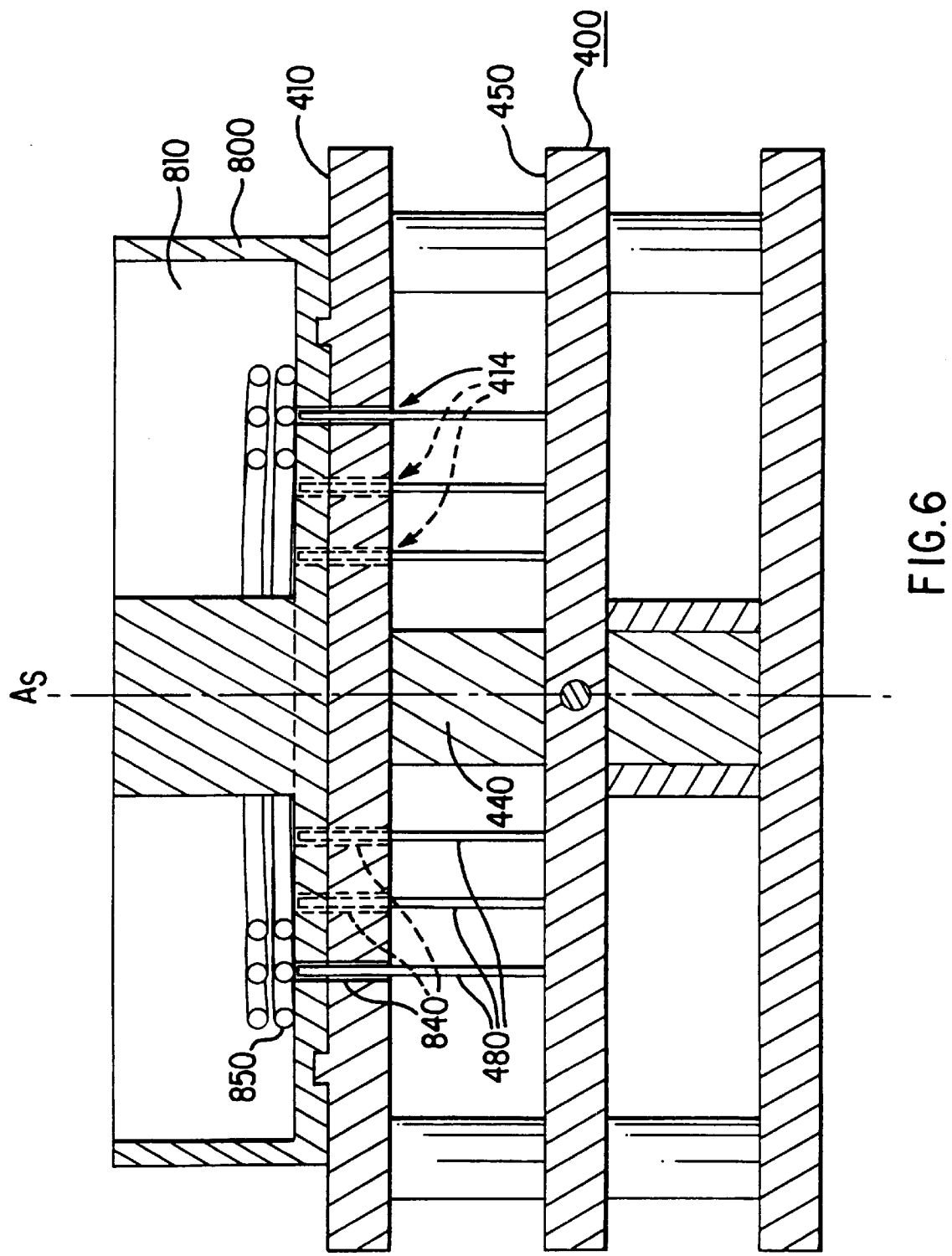
FIG. 6 is a cross-sectional view of the tray shown in FIG. 5 being used with the embodiment shown in FIG. 4.

FIG. 6 provides a cross-sectional view of base 800 in operation with lifting device 400. When lifting plate 450 is in the lower position (shown), lifters 480 can extend through plate holes 414 and can terminate in base holes 840 without extending into well 810. When lifting plate 450 is moved to its upper position (not shown), lifters 480 can extend through base holes 840 and can contact the bottom-most spooled fiber 850 in well 810, lifting spooled fiber 850 and any fibers stacked above it.

There are at least several notable differences between the two described embodiments of the present invention. Lifting device 300 of FIG. 3 can move the stack of spooled fibers by pulling or pushing wheel 310 from above. In contrast, lifting device 400 of FIG. 4 can move the stack of spooled fibers by pulling or pushing lifting, plate 450 from below. Also, lifting device 300 can be contained within tray 900, thus increasing the weight of tray 900. In contrast, lifting device 400 can be separate from base 800, thus reducing the weight of base 800.

Both described embodiments can provide a plurality of lifters. Regardless of the dimensions of the well, these lifters can move one or more stored fibers to the top, or near the top, of the well. Thus, these lifters can provide an assembler with easy access to a stored fiber. Moreover, these lifters can reduce the risk that a fiber will be damaged when accessed. Furthermore, the lifters can be locked into a desired position to prevent a fiber from moving vertically.

Figure 7:
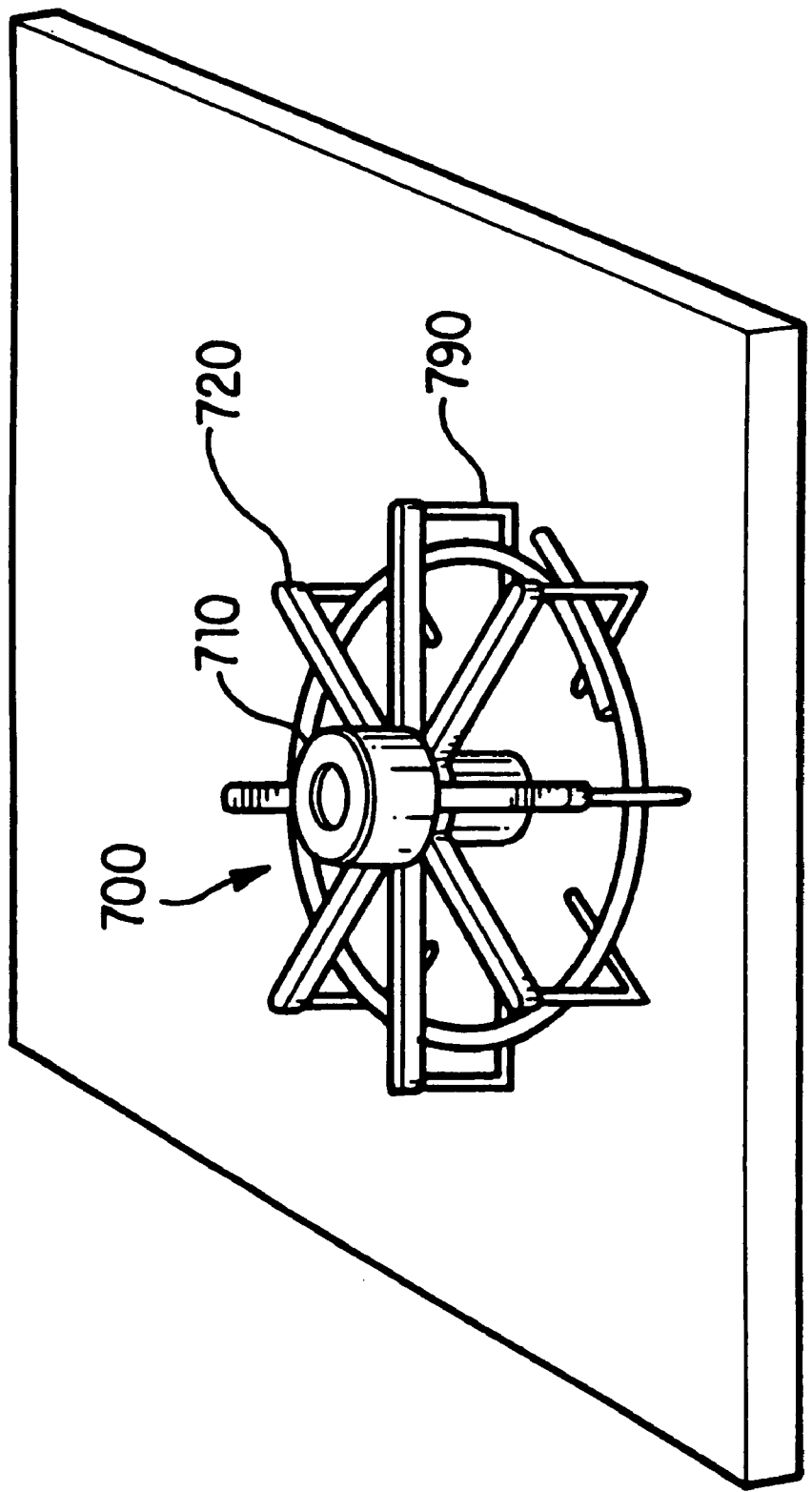
FIG. 7 is a perspective view of another alternative embodiment of the invention.

Still other advantages and embodiments of the invention will become readily apparent to those skilled in this art from the above-recited detailed description. Accordingly, the drawings and descriptions are to be regarded as illustrative in nature, and not as restrictive. For example, FIG. 7 provides a perspective view of another alternative embodiment wherein the spooled fibers can be lifted from above by a lifting device 700 that can have a plurality of lifters 720 that extend radially from a wheel 710. The lifters 720 can include releasable lifting slings (not shown) or hooks 790 that can extend beneath the bottommost fiber. Moreover, the plurality of lifters can include any number of lifters (greater than one).

What is claimed is:

1. A device for moving a plurality of optical fibers parallel to a spooling axis around which the optical fibers are spooled, comprising:
   a plurality of lifters adapted to be disposed beneath at least a bottom-most optical fiber from the plurality of optical fibers and within a plurality of recesses in a base, said plurality of lifters adapted to be movable parallel to the spooling axis.

2. The device of claim 1, wherein said plurality of lifters are adapted to be distributed around said spooling axis.

3. The device of claim 1, wherein said plurality of lifters are adapted to be equally distributed around said spooling axis.

4. The device of claim 1, further comprising a wheel attached to said plurality of lifters.

5. The device of claim 1, further comprising an elongated annular wheel attached to said plurality of lifters.

6. The device of claim 1, wherein said plurality of lifters extend radially from a wheel.

7. The device of claim 1, further comprising a wheel attached to said plurality of lifters, wherein said wheel is adapted to releasably receive a handle.

8. The device of claim 1, wherein said plurality of lifters are adapted to correspond in a one-to-one manner with the plurality of recesses.

9. The device of claim 1, wherein said plurality of lifters are adapted to correspond in a one-to-one manner with a plurality of holes defined in a base.

10. The device of claim 1, further comprising a wheel attached to said plurality of lifters, said wheel adapted to be releasably supported by a base, and a locking device attached to said wheel and adapted to be releasably engaged with the base.

11. The device of claim 1, wherein each of said plurality of lifters is adapted to be slidable through a corresponding one of a plurality of base holes defined by a base.

12. The device of claim 1, further comprising a plate attached to said plurality of lifters.

13. The device of claim 1, further comprising a plate attached to said plurality of lifters, and a rod slidably attached to said plate, said rod adapted to be aligned co-axially with the spooling axis.

14. The device of claim 1, further comprising a plate attached to said plurality of lifters, a rod slidably attached to said plate, said rod adapted to be aligned co-axially with the spooling axis, and a stop surrounding said rod.

15. The device of claim 1, further comprising a plate attached to said plurality of lifters, a rod slidably attached to said plate, said rod adapted to be aligned co-axially with the spooling axis, and a plate lock attached to said plate and releasably attached to said rod.

16. A method for moving a plurality of optical fibers parallel to a spooling axis around which the optical fibers are spooled, wherein a plurality of lifters are adapted to be disposed beneath at least a bottom-most optical fiber from the plurality of optical fibers and within a plurality of recesses in a base, and the plurality of lifters are adapted to be movable parallel to the spooling axis, the method comprising:

moving, the plurality of lifters within the plurality of recesses and parallel to the spooling axis;

contacting at least one of the optical fibers with the plurality of lifters; and relocating the plurality of spooled optical fibers.

17. The method of claim 16, wherein said moving step includes moving the plurality of lifters away from a base.

18. The method of claim 16, wherein said moving step includes moving the plurality of lifters toward a base.

19. The method of claim 16, wherein said moving step includes moving each of the plurality of lifters within a corresponding one of a plurality of recesses defined by a base.

20. The method of claim 16, wherein said moving step includes sliding each of the plurality of lifters through a corresponding one of a plurality of base holes defined by a base.

21. The method of claim 16, wherein said contacting step includes contacting a bottom-most one of the plurality of optical fibers.

22. The method of claim 16, wherein said relocating step includes relocating the plurality of spooled optical fibers along the spooling axis.

* * * * *